United States Patent
Dai et al.

(10) Patent No.: US 11,119,462 B2
(45) Date of Patent: Sep. 14, 2021

(54) SYSTEMS AND METHODS FOR HYBRID DYNAMIC STATE ESTIMATION

(71) Applicants: Renchang Dai, Sammamish, WA (US); Guangyi Liu, San Jose, CA (US); Chen Yuan, San Jose, CA (US); Peng Wei, San Jose, CA (US); Yongli Zhu, San Jose, CA (US); Yi Lu, Chengdu (CN); Zhijun Liao, Nanchang (CN); Zhiwei Wang, Cupertino, CA (US)

(72) Inventors: Renchang Dai, Sammamish, WA (US); Guangyi Liu, San Jose, CA (US); Chen Yuan, San Jose, CA (US); Peng Wei, San Jose, CA (US); Yongli Zhu, San Jose, CA (US); Yi Lu, Chengdu (CN); Zhijun Liao, Nanchang (CN); Zhiwei Wang, Cupertino, CA (US)

(73) Assignee: Global Energy Interconnection Research Institute (Gelrina), San Jose, CA (US)

( * ) Notice: Subject to any disclaimer, the term of this patent is extended or adjusted under 35 U.S.C. 154(b) by 36 days.

(21) Appl. No.: 16/596,093

(22) Filed: Oct. 8, 2019

(65) Prior Publication Data
US 2021/0103263 A1 Apr. 8, 2021

(51) Int. Cl.
*G05B 99/00* (2006.01)
*G05B 19/042* (2006.01)

(52) U.S. Cl.
CPC ....... *G05B 19/0428* (2013.01); *G05B 19/042* (2013.01); *G05B 2219/24215* (2013.01); *G05B 2219/2639* (2013.01)

(58) Field of Classification Search
CPC ............................................. G05B 2219/2639
USPC ........................................................ 700/295
See application file for complete search history.

(56) References Cited

U.S. PATENT DOCUMENTS

| | | | |
|---|---|---|---|
| 10,103,666 B1* | 10/2018 | Fan | H02P 9/00 |
| 2012/0004869 A1* | 1/2012 | Saarinen | G01R 31/3274 |
| | | | 702/59 |
| 2012/0046889 A1* | 2/2012 | Sun | H04L 12/66 |
| | | | 702/61 |
| 2012/0283967 A1* | 11/2012 | Duan | H02J 13/00002 |
| | | | 702/60 |
| 2013/0262001 A1* | 10/2013 | Sun | H02J 13/00028 |
| | | | 702/60 |
| 2014/0244189 A1* | 8/2014 | Chiang | G01R 19/2513 |
| | | | 702/61 |
| 2017/0353031 A1* | 12/2017 | Sun | H02J 3/18 |
| 2018/0284758 A1* | 10/2018 | Cella | G05B 19/41865 |

(Continued)

*Primary Examiner* — Suresh Suryawanshi
(74) *Attorney, Agent, or Firm* — PowerPatent; Bao Tran

(57) ABSTRACT

A power system energy management system with dynamic state estimation (DSE) is disclosed wherein system dynamic states are estimated using SCADA measurements, PMU measurements, signals of controllers, digital recorders, protection devices, and smart electronic devices. The DSE is solved first by Unscented Kalman Filter, and if the Unscented Kalman Filter is failed, weighted lease square is used to solve the DSE. If weighted lease square is failed, integration method is used to calculate the dynamic states. In another aspect, Unscented Kalman Filter, weighted lease square, and integration calculation are applied to solve the DSE by nodal parallel computing for each generation system.

8 Claims, 14 Drawing Sheets

---

Algorithm: State Estimation by Weighted Least Square WLS($x, z$)

1. Initialize $x^k$,

2. Build the gain matrix $G(x^k) = H^T(x^k) \cdot R^{-1} \cdot H(x^k)$, $H(x) = \frac{\partial h(x)}{\partial x}$, 3. Build the matrix $H^T(x^k) R^{-1} \left(z - h(x^k)\right)$, 4. Do LU factorization and forward/backward substitution to $\Delta x$ in the following equations $$G(x^k) \cdot \Delta x = H^T(x^k) \cdot R^{-1} \cdot (z - h(x^k))$$

till $\Delta x = \left[G(x^k)\right]^{-1} \cdot H^T(x^k) R^{-1} \left(z - h(x^k)\right) < \varepsilon$ 5. $x^{k+1} = x^k + \Delta x$ 6. $k = k + 1$, go to 2

(56) References Cited

U.S. PATENT DOCUMENTS

2020/0132772 A1\* 4/2020 Singh .................... G01R 31/343
2020/0379424 A1\* 12/2020 Wang .................... G05B 19/042

\* cited by examiner $$\dot{X} = f(X,U) \quad (1)$$
$$YU = g(X,U) \quad (2)$$

Algorithm: State Estimation by Weighted Least Square WLS($x, z$)

1. Initialize $x^k$,

2. Build the gain matrix $G(x^k) = H^T(x^k) \cdot R^{-1} \cdot H(x^k)$, $H(x) = \frac{\partial h(x)}{\partial x}$, 3. Build the matrix $H^T(x^k) R^{-1} (z - h(x^k))$, 4. Do LU factorization and forward/backward substitution to $\Delta x$ in the following equations $$G(x^k) \cdot \Delta x = H^T(x^k) \cdot R^{-1} \cdot (z - h(x^k))$$

till $\Delta x = [G(x^k)]^{-1} \cdot H^T(x^k) R^{-1} (z - h(x^k)) < \varepsilon$ 5. $x^{k+1} = x^k + \Delta x$ 6. $k = k + 1$, go to 2

FIG. 9

Algorithm: Unscented Kalman Filter UKF($x, y$)

1. Choose $2n + 1$ sigma points $x_i$
2. Calculate transformed sigma points by (12)
3. Calculate the mean $\bar{y}$ and covariance $P_{yy}$ of transformed sigma points by (13) and (14)
4. Initialize the filter $\hat{x}_0^+$ and $P_0^+$ by (15) and (16)
5. Propagate sigma points from time step $k - 1$ to $k$ by (17), (18) and (19)
6. Calculate the discreated sigma points at time step $k$ by (20)
7. Estimate the priori state and the a priori error covariance by (21) and (22)
8. Update the sigma points by the current best guess for the mean and covariance using (23), (24), and (25)
9. Transform the sigma points into predicted measurement $\hat{y}_k^i$ vectors by (26)
10. Estimate the mean and the covariance of the predicted measurement by (27) and (28)
11. Estimate the cross covariance between $\hat{x}_k^-$ and $\hat{y}_k$ by (29)
12. Calculate the Kalman gain matrix $K_k$ by (30)
13. Estimate the state by (31)

FIG. 11

Algorithm: Hybrid Dynamic State Estimation HDSE($x, z$)

1. Estimate $x$ by UKF($x, z$)
2. IF ($|z_i - f(x_i)| > 3\sigma$, $\sigma$ is standard deviation of measurement $z_i$
3.     Estimate $x$ by WLS($x, z$)
4. IF ($|z_i - f(x_i)| > 3\sigma$
5.     Calculate $x$ by $x = x^- + \frac{h}{2}(f(x^-, u^-) + f(x, u))$

FIG. 15

Algorithm: Parallel Hybrid Dynamic State Estimation PaHDSE($x, z$)

1. FOR GENERATOR g IN GENERATOR SET
2.     SELECT state subset $x_g$ and measurement subset $z_g$
3.     Estimate $x_g$ by HDSE($x_g, z_g$) in parallel

FIG. 16

SYSTEMS AND METHODS FOR HYBRID DYNAMIC STATE ESTIMATION

BACKGROUND OF THE INVENTION

The teachings herein relate generally to model, approach, and computer program for hybrid dynamic state estimation (DSE) in power systems.

State estimation is the core application of the Energy Management System (EMS) and plays an important role in the monitoring, control and stability analysis of power systems. Efficient, timely and accurate state estimation is a prerequisite for the reliable operation of modern power grids.

In present state of the art, however, the static state estimation (SSE) method assumes that the system is operating in a steady state and cannot estimate the dynamic process of the system.

At present, the state estimation of EMS in control center based on the steady-state power system model cannot capture the dynamic changes of the system. This limitation is mainly due to the state estimation being dependent on the SCADA system, which is slow in sampling. Therefore, state estimates are updated every few seconds to a few minutes. The controller of the generator and FACTS equipment can collect a large amount of information and measurements, but it is limited to local control use and cannot be uploaded to the control center for system state estimation.

In Dynamic State Estimation (DSE), since dynamic changes in the power system need to be continuously monitored and estimated, it is necessary to perform power system state estimation in short time intervals. The static estimator cannot effectively and accurately capture the dynamic behavior of large-scale power systems.

The DSE algorithm predicts the system state at the next moment k+1 by the state measurements obtained at the current moment k. As the number of installed PMUs increases, the development of DSE for power system monitoring, control, and protection becomes possible.

The dynamic state estimation algorithm calculates the dynamics of the system, which are state variables in a set of nonlinear differential algebraic equations representing the power system. The first step in the dynamic state estimation process is to identify mathematical modeling of the time characteristics of the power system. By using the mathematical model of the system and the collected measurement data, the DSE predicts the dynamic state vector one step ahead.

Synchronous phasor measurement is one of the sources of information for performing DSE when the system is operating under transient conditions. Besides, equipment controllers, digital recorders, and protection devices can provide the dynamic information needed to perform DSE.

In order to estimate the dynamic state vector of a general discrete-time state space model, various nonlinear filters based on Kalman filters are often used. It usually consists of two steps, the prediction step and the filtering/updating step.

The classical Kalman filter technique is used for linear dynamic state estimation. However, since the power system is nonlinear, some adjustments and improvements have been made to the classical Kalman filter method to meet these requirements. Two improvements to the classical Kalman filter method are referred to as "Extended Kalman filters" and "Unscented Kalman filters.".

The Kalman filter finds the precise value of an unknown variable for a system based on measurements or inputs that contain noise and error. The Kalman filter is a dynamic state estimator. It runs over time by observing the input data and trying to find the best estimate of the original system state variables. Kalman filter is based on assumptions. The first assumption is that the system under study must have linear properties. The second assumption is that the measurement error follows a Gaussian distribution.

Extended Kalman Filter is a practical method for calculating state variable estimates in power system network problems. However, one of the disadvantages of the Extended Kalman Filter method is that it does not produce an optimal solution or estimate. Estimation depends on the accuracy of the measurement set and the continuity of the transition model. Another disadvantage of the Extended Kalman Filter is that it is difficult to implement and tune, and the linearized Jacobian matrix can cause singularity issue.

Unlike the linearization method of Extended Kalman Filter, Unscented Kalman Filters uses a nonlinear function. It finds the state estimate by approximating the probability distribution of the nonlinear system. It improves the Kalman filter through the Unscented Transform. Unscented Transform is a mathematical or statistical algorithm that converts a nonlinear function into a probability distribution corresponding to a finite set. It is difficult to transform whole state distribution through a non linear function but it is easy to transform some individual points of the state distribution. These individual points in the probability are called sigma points. After performing the transformation, an estimate of the result is produced in the form of an average vector and its error covariance matrix by applying a known nonlinear function to each of these vectors.

Limitations of the Unscented Kalman Filter are the method relying on continuous measurements and high sampling rate. When communication failure causes loss of measurements, Unscented Kalman Filter has no capability to estimate the behavior of system dynamics.

In the case of insufficient measurements, DSE without the present invention does not estimate state with error in tolerance. With present DSE method, the state estimation may result in diverge. The state-of-art DSE presents risks in power system operation.

To conquer the limitations of the Unscented Kalman Filter Estimation, a hybrid dynamic state estimation method driven by data and model is invented. The method estimates state variables by measurements (Data) and dynamic equations (Model) complimentarily. To optimize the state estimation, weighted least square method is applied to take the redundant measurements.

SUMMARY

The above discussed and other drawbacks and deficiencies are overcome or alleviated by the teachings disclosed herein.

In one aspect, a hybrid DSE device estimates dynamic states of power system in normal operation and during transient condition.

In another aspect, also disclosed is a method for using Unscented Kalman Filter to solve the hybrid DSE.

In a further aspect, a method using weighted least square (WLS) algorithm to solve the hybrid DSE is also disclosed.

In yet another aspect, a hybrid DSE model is also disclosed to combine the Unscented Kalman Filter, the weighted least square algorithm, and integration calculation approach depending on the measurement availability and adoption of each method.

In another aspect, further disclosed is a parallel computation method using nodal parallelism to improve the efficiency of the hybrid DSE.

The features and advantages of the present invention will be appreciated and understood by those skills in the art from the following detailed description and drawings.

BRIEF DESCRIPTION OF THE DRAWINGS

The features of the exemplary embodiments believed to be novel and the elements characteristic of the exemplary embodiments are set forth with particularity in the appended claims. Figures are for illustration purposes only and are not drawn to scale. The exemplary embodiments, both as to organization and method of operation, may best be understood by reference to the detailed description which follows taken in conjunction with the accompanying drawings in which:

FIG. 9 depicts an exemplary pseudo code of weighted least square method to estimate dynamic states;

FIG. 11 depicts an exemplary pseudo code of the Unscented Kalman Filter;

FIG. 15 depicts an exemplary pseudo code of the hybrid DSE; and

FIG. 16 depicts an exemplary parallel calculation method for the hybrid DSE.

DETAILED DESCRIPTION OF THE INVENTION

Figure 1:
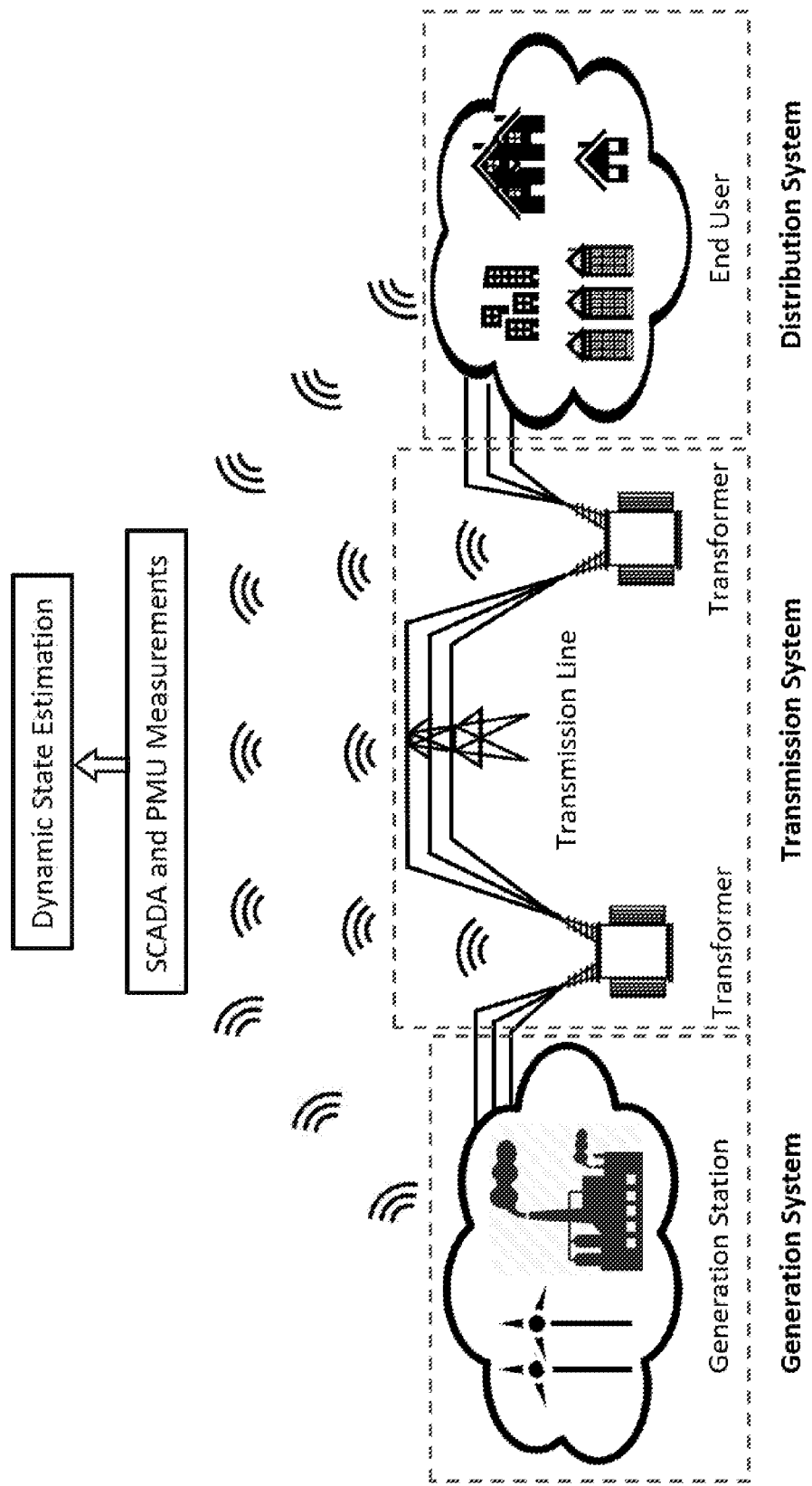
FIG. 1 is an exemplary diagram of power system in which dynamic states are estimated.

Referring to FIG. 1, a diagram of an exemplary power system is shown where dynamic states are estimated. The power system of FIG. 1 has power generation system, power transmission system and power distribution system.

Supervisory Control And Data Acquisition (SCADA) system and Phasor Measurement Units (PMUs) obtains the active power, reactive power of generator, transmission line, transformer, and load, voltage phasors of system buses, including voltage magnitudes and phase angles, at a given moment. The equipment controllers, digital recorders, protection devices, and smart electronic devices obtains generator speed, generator power angle, $V_R$, $V_A$, $V_F$, $E_{fd}$ of excitor, $\delta$, $\mu F_1$, $F_2$, $P_{T1}$, $P_{T2}$ of governor, $V_A$, $V_{P1}$, $V_{P2}$, $V_S$ of power system stabilizer etc. The system states are estimated based on the measurements.

Figure 2:
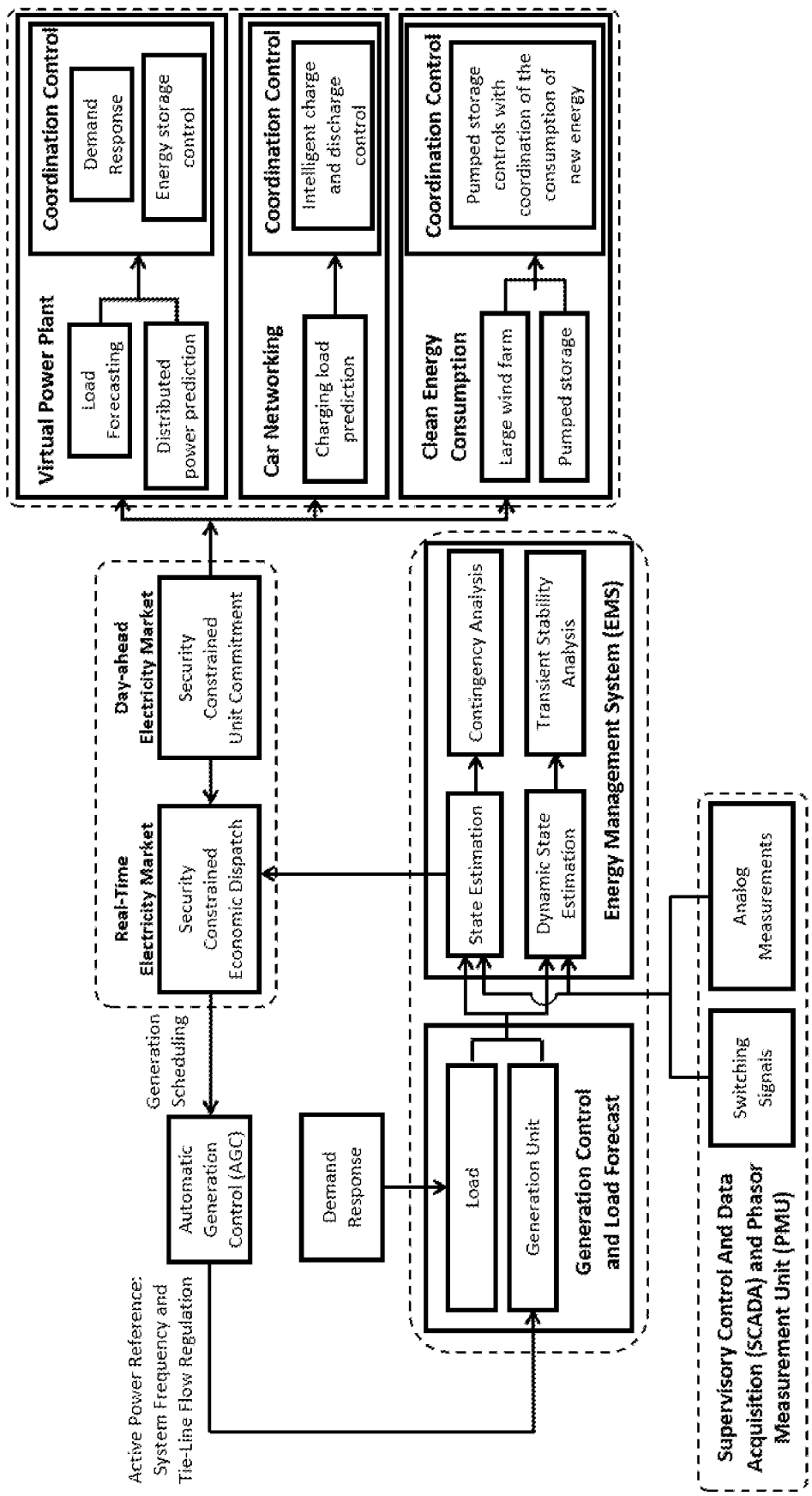
FIG. 2 is an exemplary diagram of DSE related to other functions in power system operation.

Referring to FIG. 2, a diagram of DSE is shown relative to other functions in power system operation. FIG. 2 shows that state estimator provides base case for power flow, contingency analysis, security constrained economic dispatch, security constrained unit commitment, and other applications, and dynamic state estimator provides base case for transient stability analysis with measurement information from Supervisory Control And Data Acquisition (SCADA) and Phasor Measurement Unit (PMU).

Figure 3:
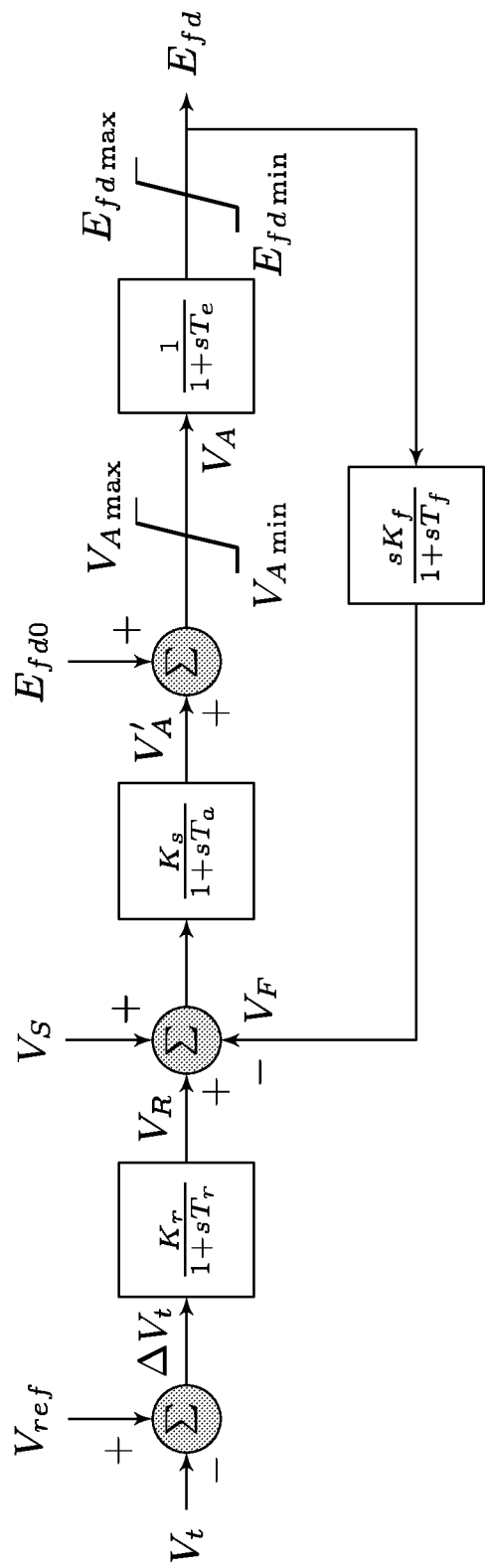
FIG. 3 is an exemplary type I excitor transfer function block diagram.

FIG. 3 shows an exemplary type I excitor transfer function block diagram; where $V_R$ is measured mismatch between the voltage command and the voltage feedback; $V_A$ is state variable after the excitor amplifier; $V_F$ is state variable after the excitor feedback; $E_{fd}$ is the excitor field voltage.

Figure 4:
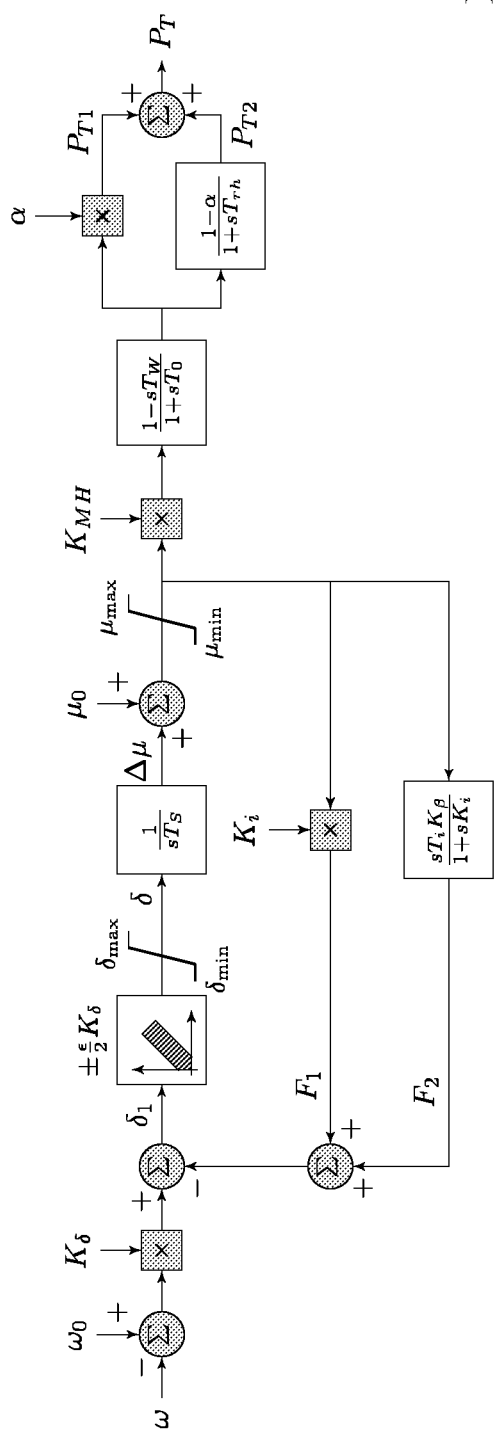
FIG. 4 is an exemplary governor transfer function bock diagram.

FIG. 4 shows an exemplary governor transfer function bock diagram; where $\delta$ is the state of pilot valve; $\mu$ is the gate position; $F_1$ is permanent droop feedback; $F_2$ transient droop feedback; $P_{T1}$ is mechanical power output; $P_{T2}$ is mechanical power by overheating effect.

Figure 5:
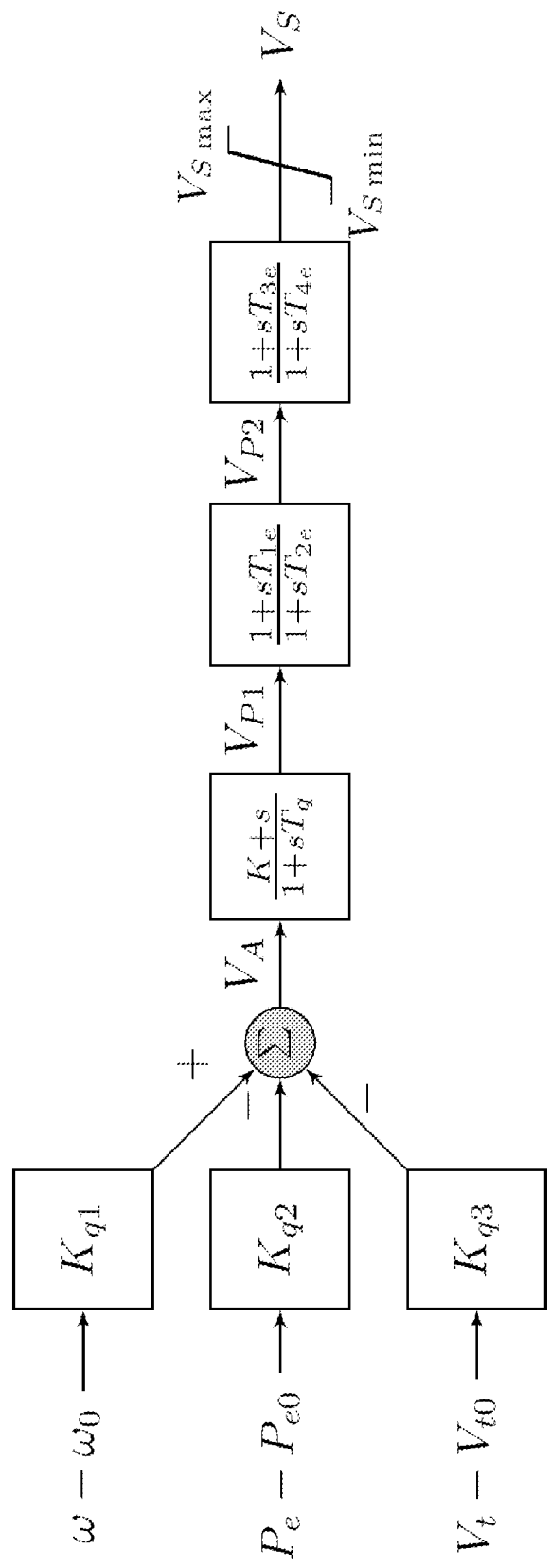
FIG. 5 is an exemplary type I PSS function block diagram.

FIG. 5 shows an exemplary type I PSS function block diagram; where $V_A$ is the measured mismatch; $V_{P1}$ is state varaible after the DC filter; $V_{P2}$ is the output state variable of the lead-lag filter, $V_S$ is the output voltage of PSS.

Figures 6, 7:
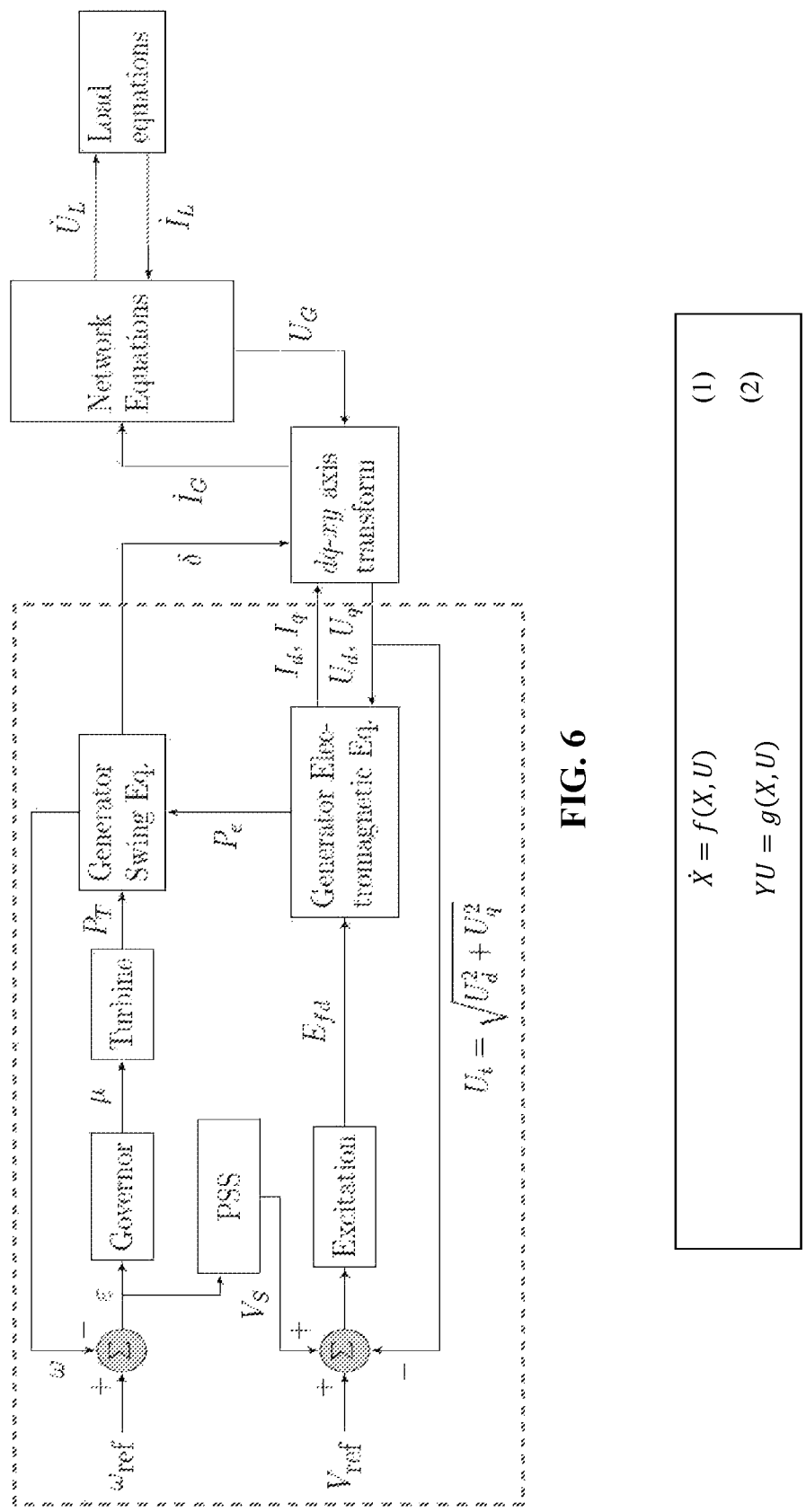
FIG. 6 is the diagram of connection of dynamic equipment to power network.
FIG. 7 is the differential algebraic equations (DAEs) representing the mathematical model of the power system dynamics.

Referring to FIG. 6, a power system includes networks and dynamic elements, such as the generator and the load being connected to the network. FIG. 6 illustrates, for a power-system DAE solution, the relationships between the main variables associated with generators, loads, and the network.

FIG. 7 shows a mathematical model of the power system dynamics which is a set of differential algebraic equations (DAEs), where equation (1) is the differential dynamic equation, equation (2) is algebraic power flow equation. X is the state vector, U is voltage vector, Y is admittance matrix. g(X, U) is nonlinear equation used to calculate the generator current injection to network. To solve the DAEs, when sequential method is adopted, dynamic equation (1) can be solved when bus voltage is calculated in power flow equation.

Using sequential method, in each iteration, the power flow equations are solved to update the network bus voltage U including generator terminal voltage. Differential equations use generator terminal bus voltage as boundary condition to solve the dynamic states X of the generator, excitor, governor, PSS, and current injections from generator to network. The updated current injections g(X, U) are applied to solve network in the next iteration until the converged solution is achieved.

Figure 8:
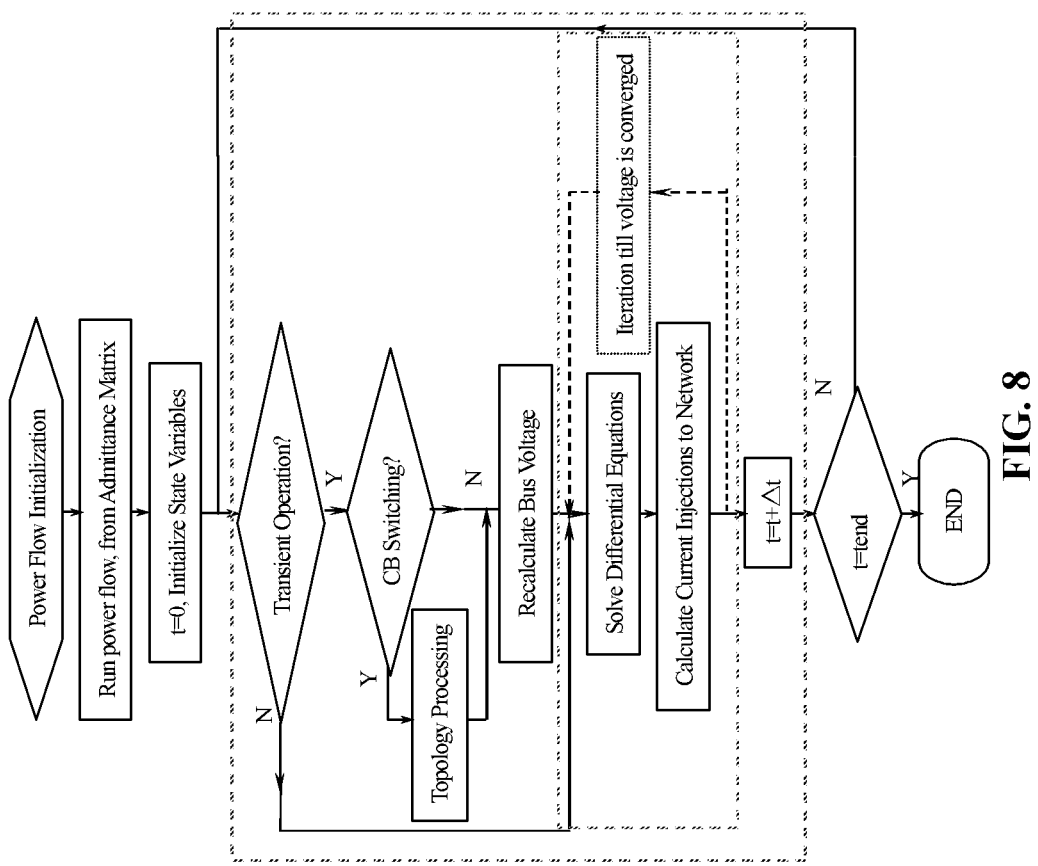
FIG. 8 shows an exemplary flowchart depicting the sequential method to simulate the power system dynamics.

FIG. 8 shows the flowchart of the sequential method. In the inner loop highlighted by the dashed red line, the voltage terminal voltage is used to calculate the state variables of the generation system (including generator, governor, excitor, PSS, and other equipment associated with generation) and current injections. The calculated injections are applied to solve network equations until the voltage is converged. Then the dynamic simulation is moved to the next time step in the outer loop highlighted by the dashed blue line.

To solve the differential equations (1), integration method is applied to change the differentiated equations to difference equations. Taking trapezoidal rule as example, equations (1) can be changed as:

$$x = x^- + \frac{h}{2}(f(x^-, u^-) + f(x, u)) \quad (4)$$

Where, u and u⁻ are generator terminal voltage at the current time step and the previous time step. x and x⁻ are state variables at the current time step and the previous time step. When generator terminal voltage and state variables of the generator system at current time step and the previous time step are measured, weighted least square (WLS) algorithm is applied to estimate the state variables x and terminal voltage u at the current time step.

The weighted least square algorithm is the most widely used methodology in existing state estimators to minimize the weighted sum of the square of residuals between the actual measurements and estimations. The measurement model in power system state estimation is presented below.

$$z = h(x) + e \quad (5)$$

where z is the measurements vector, x is the system state vector, including generator terminal voltage magnitude, voltage angle, speed, power angle, active power, and reactive power, $V_R$, $V_A$, $V_F$, $E_{fd}$ of exciter, δ, μ, $F_1$, $F_2$, $P_{T1}$, $P_{T2}$ of governor, $V_A$, $V_{P1}$, $V_{P2}$, $V_S$ of power system stabilizer at previous time step and current time step etc., h(x) is the nonlinear measurement function vector and e is a vector of measurement errors, being considered as Gaussian noise with zero means.

The state variables considered here are states in the differential equations (1) while the measurements are these mentioned above. Nonlinear WLS state estimation is then formulated as:

$$\text{minimize: } J(x) = [z-h(x)]^T \cdot R^{-1} \cdot [z-h(x)]$$

$$\text{subject to: } z = h(x) + e$$

The following equation is obtained at the minimum:

$$g(x) = \frac{\partial J(x)}{\partial x} = -H^T(x) \cdot R^{-1} \cdot [z - h(x)] = 0 \quad (6)$$

where g(x) is the matrix of the gradient of the objective function J(x), $$H(x) = \frac{\partial h(x)}{\partial x}$$

is the Jacobian matrix of h(x) and $R^{-1}$ is the weight matrix. Substituting the first-order Taylor's expansion of g(x) in equation (6), the following equation (7) is iteratively solved to find the solution that minimizes J(x).

$$\Delta x = [G(x^k)]^{-1} \cdot H^T(x^k) \cdot R^{-1} \cdot (z - h(x^k)) \quad (7)$$
$$G(x^k) \cdot \Delta x = H^T(x^k) \cdot R^{-1} \cdot (z - h(x^k))$$
where, $$g(x^{k+1}) = g(x^k) + G(x^k) \cdot (x^{k+1} - x^k) = 0 \quad (8)$$

$$G(x^k) = \frac{\partial g(x^k)}{\partial x} = H^T(x^k) \cdot R^{-1} \cdot H(x^k) \quad (9)$$

$$x^{k+1} = x^k + \Delta x \quad (10)$$

FIG. 9 shows the pseudo code of the weighted least square algorithm.

Figure 10:
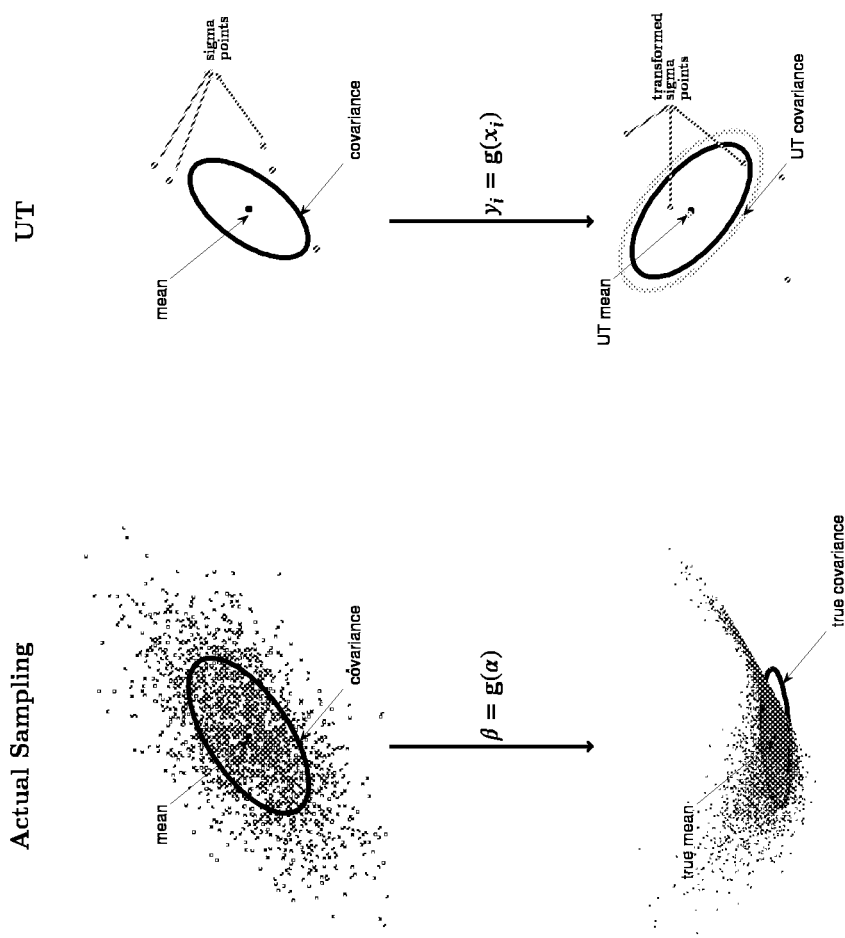
FIG. 10 depicts an exemplary concept of the unscented transform mean and covariance propagation.

FIG. 10 depicts the concept of the unscented transform mean and covariance propagation. Suppose that x is an n-dimensional dynamic state variable to be estimated. Its mean value is m and covariance is $P_{xx}$.

The measurements y is nonlinear function to x.

$$y = f(x) \quad (11)$$

To estimate the mean value and covariance of x, a set of sigma points are deterministically chosen which capture the mean and covariance of the original distribution of x exactly. In general, 2n+1 sigma points are selected to define a discrete distribution having a given mean and covariance in n dimensions. The sigma points are then propagated to calculate the mean of measurement y and its covariance $P_{yy}$.

Next, the previously obtained sigma points can be transformed through non-linear measurement function and as a result the transformed sigma points are calculated as below:

$$y_i = f(x_i) \quad (12)$$

Then the mean and covariance of y can be calculated by using the previously calculated transformed sigma points as:

$$y = \sum_{i=0}^{2n} y_i \quad (13)$$

$$P_{yy} = \sum_{i=0}^{2n} (y_i - y)(y_i - y)^T \quad (14)$$

Initialize the filter:

$$\hat{x}_0^+ = E(x_0) \quad (15)$$

$$P_0^+ = E[(x_0 - \hat{x}_0)(x_0 - \hat{x}_0^+)^T] \quad (16)$$

The subscript+ indicates the estimate is in a posteriori estimate.

To propagate from time step k−1 to k, the sigma points $\hat{x}_{k-1}^i$ are selected according to the following formula:

$$\hat{x}_{k-1}^i = \hat{x}_{k-1}^+ + \tilde{x}^i, i = 1, 2, \ldots, 2n \quad (17)$$

$$\tilde{x}^i = (\sqrt{nP_{k-1}^+})_i^T, i = 1, 2, \ldots, n \quad (18)$$

$$\tilde{x}^{n+i} = -(\sqrt{nP_{k-1}^+})_i^T, i = 1, 2, \ldots, n \quad (19)$$

Use the known nonlinear difference equation (4) to discreate the sigma points into $\hat{x}_k^i$ vectors.

$$\hat{x}_k^i = g(\hat{x}_{k-1}^i, u_k, t_k) \quad (20)$$

Combine the $\hat{x}_k^i$ vectors to obtain the a priori state estimate at time k which is given by the following formula:

$$\hat{x}_k^- = \frac{1}{2n} \sum_{i=0}^{2n} \hat{x}_k^i \quad (21)$$

Estimate the a priori error covariance:

$$P_k^- = \frac{1}{2n} \sum_{i=0}^{2n} (\hat{x}_k^i - \hat{x}_k^-)(\hat{x}_k^i - \hat{x}_k^-)^T \quad (22)$$

Choose sigma points $\hat{x}_k^i$ with appropriate changes since the current best guess for the mean and covariance of $x_k$ are $\hat{x}_k^-$ and $P_k^-$:

$$\hat{x}_k^i = \hat{x}_k^- + \tilde{x}^i, i = 1, 2, \ldots, 2n \qquad (23)$$

$$\tilde{x}^i = \left(\sqrt{(n+\lambda)P_{k-1}^-}\right)_i^T, i = 1, 2, \ldots, n \qquad (24)$$

$$\tilde{x}^{n+i} = -\left(\sqrt{(n+\lambda)P_k^-}\right)_i^T, i = 1, 2, \ldots, n \qquad (25)$$

Use the known nonlinear measurement equation $f(\cdot)$ to transform the sigma points into $\hat{y}_k^i$ vectors as follow:

$$\hat{y}_k^i = f(\hat{x}_k^i) \qquad (26)$$

Combine the $\hat{y}_k^i$ vectors to obtain the predicted measurement at time k:

$$\hat{y}_k = \frac{1}{2n}\sum_{i=0}^{2n}\hat{y}_k^i \qquad (27)$$

Estimate the covariance of the predicted measurement:

$$P_y^- = \frac{1}{2n}\sum_{i=0}^{2n}(\hat{y}_k^i - \hat{y}_k)(\hat{y}_k^i - \hat{y}_k)^T \qquad (28)$$

Estimate the cross covariance between $\hat{x}_k^-$ and $\hat{y}_k$:

$$P_{xy}^- = \frac{1}{2n}\sum_{i=0}^{2n}(\hat{x}_k^i - \hat{x}_k^-)(\hat{y}_k^i - \hat{y}_k)^T \qquad (29)$$

The measurement update of the state estimate can be performed by using the normal Kalman filter equations:

$$K_k = P_{xy}^- P_y^{-} \qquad (30)$$

$$\hat{x}_k^+ = \hat{x}_k^- + K_k(y_k - \hat{y}_k) \qquad (31)$$

Where $K_k$ is the Kalman gain matrix, $\hat{x}_k^+$ is the state estimate.

FIG. 11 depicts the pseudo code of the Unscented Kalman Filter. The algorithm includes two parts. The first part is from step 1 to step 7 for prediction. The second part is from step 8 to step 13 for filtering/updating. The prediction uses the sigma points to predict the priori state and priori error covariance. The update portion updates the sigma points and estimate the states.

Figure 12:
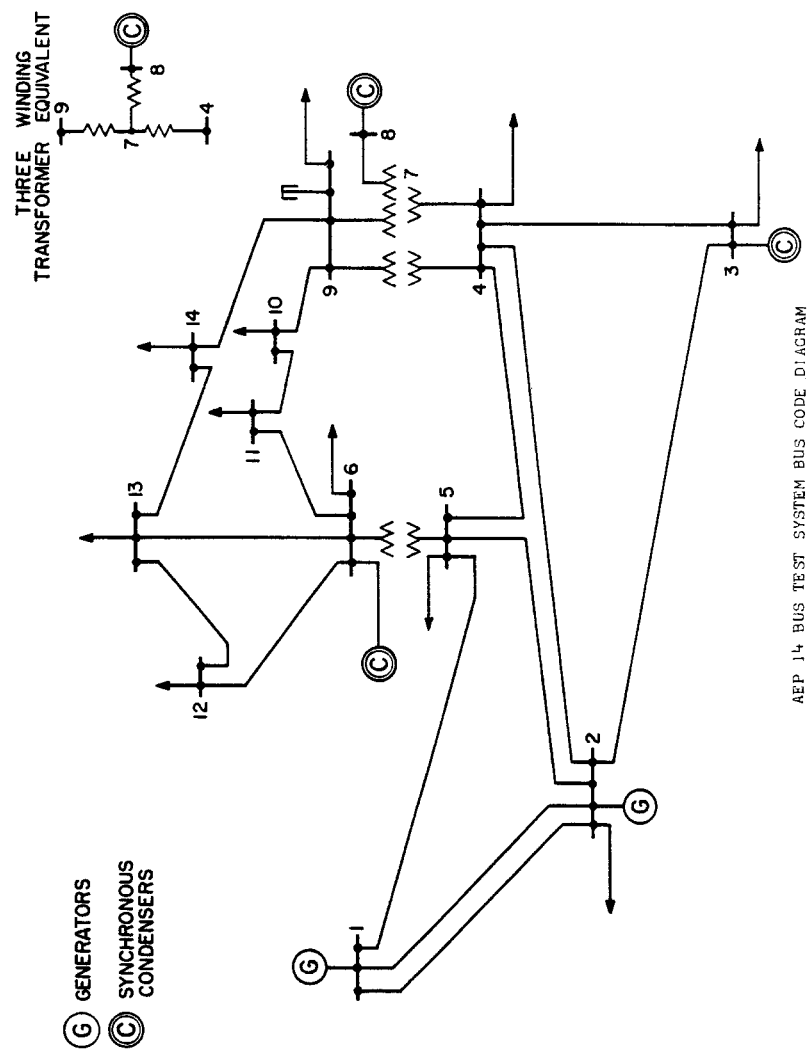
FIG. 12 depicts an exemplary tested IEEE 14 bus power system.

FIG. 12 is the one-line diagram of the IEEE 5-Generator 14-Bus system used to demonstrate the performance of Unscented Kalman Filter. The IEEE 5-Generator 14-Bus system represents a portion of the American Electric Power System (in the Midwestern US) as of February 1962. It has 20 branches, 14 buses, and 5 generators. In the case study, the rotor speed and power angle of five generators are state variables and to be estimated. The transient event simulated is that the transformer winding 4-7 is tripped at t=4 s.

Figure 13:
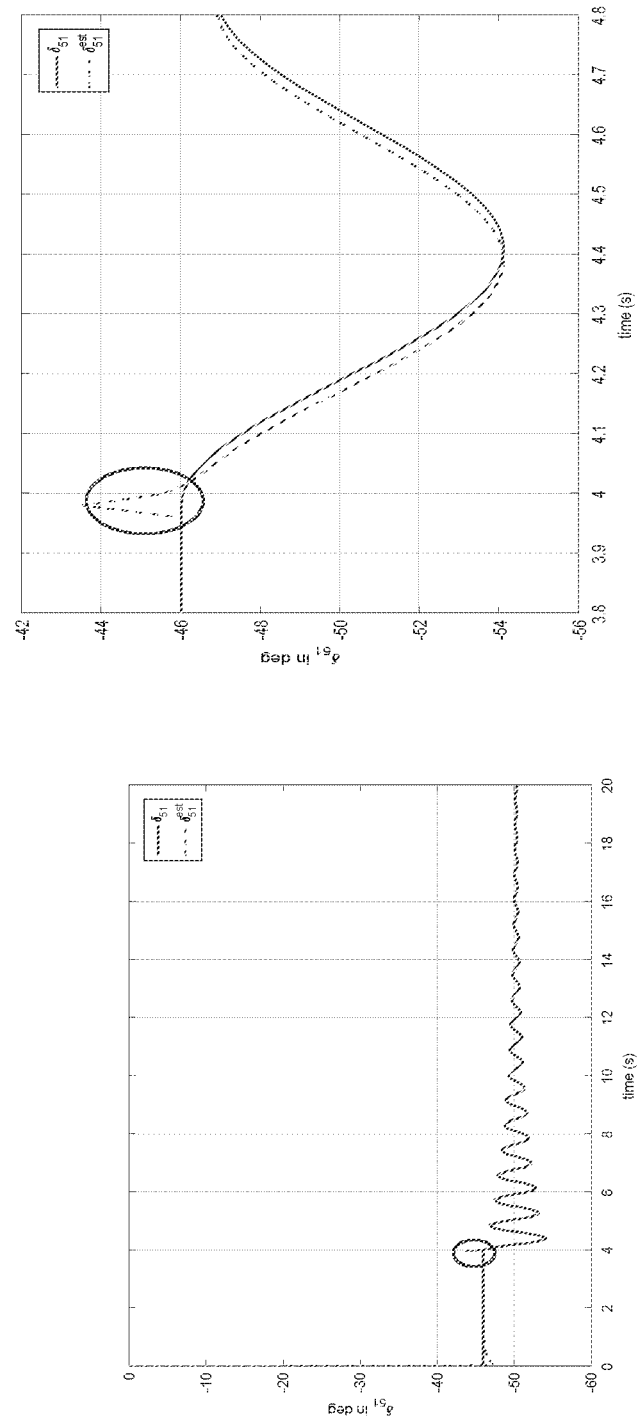
FIG. 13 illustrate an exemplary Unscented Kalman Filter limitation on time delay and jump error.

FIG. 13 illustrate Unscented Kalman Filter limitation on time delay and jump error. When zoom in to the waveform highlighted by the blue circuit, it's observable that Unscented Kalman Filter Estimation has significant error when the transformer winding 4-7 of the IEEE 14 bus system is tripped at t=4 s. The estimated power angle (and generator speed) has time delay also.

Figure 14:
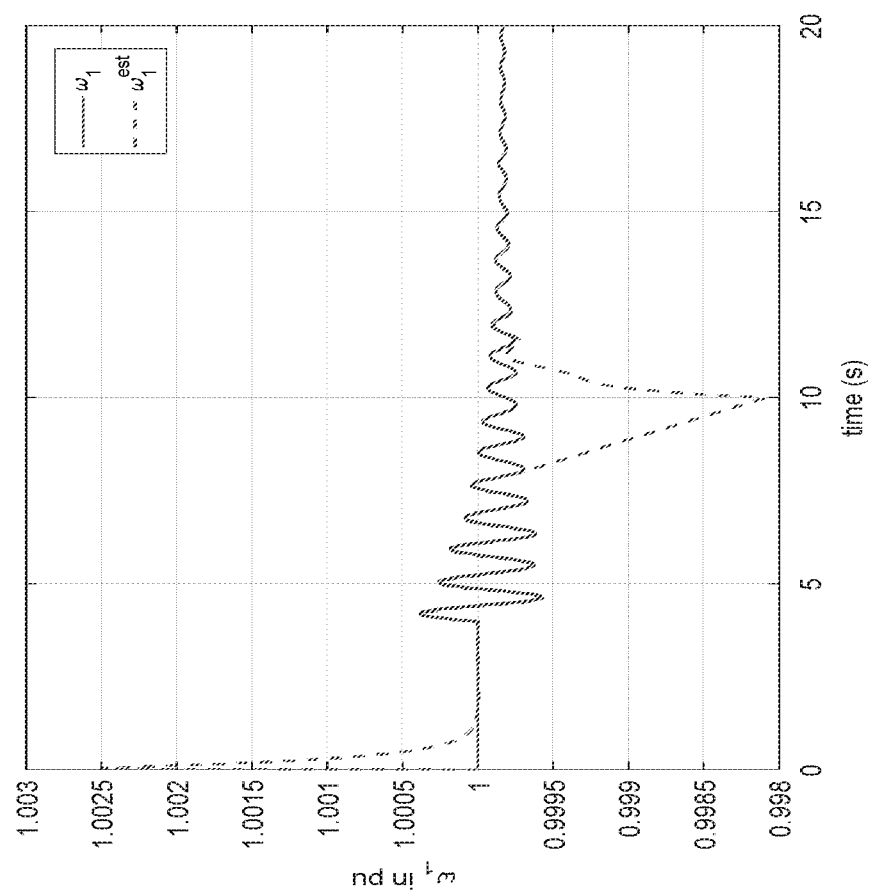
FIG. 14 illustrate an exemplary Unscented Kalman Filter limitation at bad data scenario.

FIG. 14 illustrate Unscented Kalman Filter limitation at bad data scenario. When communication failure causes loss of measurements, Unscented Kalman Filter has no capability to estimate the behavior of system dynamics. The FIG. 14 demonstrates the Unscented Kalman Filter performance when the measurements are unavailable from t=8 s to t=10 s. When measurement availability is insufficient, the Unscented Kalman Filter cannot estimate the states.

When Unscented Kalman Filter estimation and the measurement has big error, e.g. the residual between the estimation and the measurement is larger than a tolerance (for example, 3 measurement standard deviations), weighted least square algorithm is adopted to estimate the dynamic states as depicting in FIG. 15. In the hybrid dynamic state estimation algorithm in FIG. 15, when both Unscented Kalman Filter and weighted least square algorithm fail to estimate the dynamic state, integration method is used to calculate the dynamic state at the current time step using variables at previous time step.

Using the sequential method, when the generator terminal voltage is calculated by network algebraic equations, the dynamic states for each generation system will be estimated in parallel. The estimate of each generation system is independent. The parallel hybrid dynamic state estimation algorithm is depicted in FIG. 16.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module", "machine", or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A system to estimate and control a power system, comprising:
    a processor to receive data from the power system, including Supervisory Control And Data Acquisition (SCADA) system measurements, Phasor Measurement Units (PMUs) measurements, signals of controllers, digital recorders, protection devices, and smart electronic devices; and
    computer readable code to perform dynamic state estimation (DSE) using three or more alternatives in order of computational complexity for determining the DSE, the code providing state estimates using the SCADA system measurements, PMU measurements, signals of controllers, digital recorders, protection devices, and smart electronic devices, wherein the state estimation includes determining:

$$g(x) = \frac{\partial J(x)}{\partial x} = -H^T(x) \cdot R^{-1} \cdot [z - h(x)] = 0$$

where g(x) is the matrix of the gradient of the objective function J(x), $$H(x) = \frac{\partial h(x)}{\partial x}$$

is the Jacobian matrix of h(x) and $R^{-1}$ is the weight matrix; and
    controlling the power system by the processor in accordance with the state estimation.

2. The system of claim 1, comprising code to minimize a weighted sum of a square of residuals between actual measurements and estimations.

3. The system of claim 1, wherein the processor performs hybrid dynamic state estimation with data and model.

4. The system of claim 1, comprising an Unscented Kalman Filter to estimate the dynamic states of power system.

5. The system of claim 4, comprising a weighted least square code applied to estimate dynamic states the of power system when the Unscented Kalman Filter fails to estimate states.

6. The system of claim 5, comprising code with an integration method to calculate power system dynamic states using DAE equations when both Unscented Kalman Filter and weighted least square code fail to estimate states.

7. The system of claim 1, comprising code with an objective function in which a total weighted sum of the square of residuals between the actual measurements and estimations is minimized.

8. The system of claim 1, comprising code with:
   algebraic representation of network power flow balance;
   differential representation of a dynamic behavior of dynamic equipment in the power system.

* * * * *